US011174048B2

(12) United States Patent
Koehler et al.

(10) Patent No.: US 11,174,048 B2
(45) Date of Patent: *Nov. 16, 2021

(54) SATELLITE WITH INTEGRAL THRUSTERS

(71) Applicant: Raytheon Company, Waltham, MA (US)

(72) Inventors: Frederick B. Koehler, Tucson, AZ (US); Jeremy C. Danforth, Tucson, AZ (US); Ward D. Lyman, Tucson, AZ (US); Mark T. Langhenry, Tucson, AZ (US); Matt H. Summers, Marana, AZ (US); Paul E. Pontius, Highlands Ranch, CO (US); Brian M. Pape, Aurora, CO (US); Jared D. Stallings, Denver, CO (US); James K. Villarreal, Tucson, AZ (US); Thomas Villarreal, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 363 days.

This patent is subject to a terminal disclaimer.

(21) Appl. No.: 16/266,520

(22) Filed: Feb. 4, 2019

(65) Prior Publication Data
US 2020/0024003 A1    Jan. 23, 2020

Related U.S. Application Data (63) Continuation of application No. 15/091,008, filed on Apr. 5, 2016, now Pat. No. 10,220,966.

(51) Int. Cl.
*B64G 1/40* (2006.01)
*F02K 9/24* (2006.01)
(Continued)

(52) U.S. Cl.
CPC .............. *B64G 1/403* (2013.01); *B33Y 70/00* (2014.12); *B33Y 80/00* (2014.12); *B64G 1/10* (2013.01);
(Continued)

(58) Field of Classification Search
CPC .. B64G 1/26; B64G 1/40; B64G 1/403; F02K 9/34
See application file for complete search history.

(56) References Cited

U.S. PATENT DOCUMENTS 2,488,154 A * 11/1949 Africano .................. F02K 9/14
60/255
2,987,881 A     6/1961  Mullane
(Continued)

FOREIGN PATENT DOCUMENTS

ES        2342520      2/2008
WO    2014/120299 A2   8/2014

OTHER PUBLICATIONS

International Search Report and Written Opinion for co-pending International Application No. PCT/US2016/056387 dated Jan. 17, 2017.
(Continued)

*Primary Examiner* — Joseph W Sanderson
(74) *Attorney, Agent, or Firm* — Renner, Otto, Boisselle & Sklar, LLP (57) ABSTRACT

A satellite has thrusters that are integral parts of its frame. The frame defines cavities therein where thrusters are located. The thrusters may include an electrically-operated propellant and electrodes to activate combustion in the electrically-operated propellant. The frame may be additively manufactured, and the propellant and/or the electrodes may also be additively manufactured, with the frame and the propellant and/or the electrodes also being manufactured in
(Continued)

a single process. In addition the thrusters may have nozzle portions through which combustion gases exit the thrusters. The thrusters may be located at corners and/or along edges of the frame, and may be used to accomplish any of a variety of maneuvers for the satellite. The satellite may be a small satellite, such as a CubeSat satellite, for instance having a volume of about 1 liter, and a mass of no more than about 1.33 kg.

21 Claims, 6 Drawing Sheets

(51) Int. Cl.
  *F02K 9/95*      (2006.01)
  *B33Y 80/00*     (2015.01)
  *B64G 1/26*      (2006.01)
  *F02K 9/80*      (2006.01)
  *B64G 1/10*      (2006.01)
  *F02K 99/00*     (2009.01)
  *F02K 9/94*      (2006.01)
  *B33Y 70/00*     (2020.01)

(52) U.S. Cl.
  CPC ............... *B64G 1/26* (2013.01); *F02K 9/24* (2013.01); *F02K 9/80* (2013.01); *F02K 9/94* (2013.01); *F02K 9/95* (2013.01); *F02K 99/00* (2013.01); *F05D 2210/20* (2013.01); *F05D 2230/31* (2013.01)

(56) References Cited

U.S. PATENT DOCUMENTS

| | | | |
|---|---|---|---|
| 3,636,709 A | 1/1972 | La Rocca | |
| 5,646,847 A | 7/1997 | Ratan et al. | |
| 7,770,380 B2* | 8/2010 | Dulligan | F02K 9/22 |
| | | | 60/254 |
| 8,826,640 B2* | 9/2014 | Olden | F42B 10/661 |
| | | | 60/253 |
| 8,857,338 B2* | 10/2014 | Sawka | E21B 43/263 |
| | | | 102/202 |
| 9,086,033 B2* | 7/2015 | Dushku | F02K 9/08 |
| 9,334,068 B2 | 5/2016 | Kronahus | |
| 9,790,895 B2* | 10/2017 | Nelson | B64G 1/26 |
| 9,963,248 B2* | 5/2018 | Wang | B64G 1/283 |
| 10,220,966 B2* | 3/2019 | Koehler | F02K 9/80 |
| 2007/0040702 A1 | 2/2007 | Mosher et al. | |
| 2008/0092521 A1 | 4/2008 | Dulligan et al. | |
| 2010/0096030 A1 | 4/2010 | Hinkley | |
| 2011/0259230 A1 | 10/2011 | Sawka et al. | |
| 2012/0060468 A1 | 3/2012 | Dushku et al. | |
| 2012/0117941 A1 | 5/2012 | Olden et al. | |
| 2012/0137912 A1 | 6/2012 | Sawka | |
| 2013/0019587 A1 | 1/2013 | Hoffman et al. | |
| 2014/0026537 A1 | 1/2014 | Eilers et al. | |
| 2014/0174313 A1 | 6/2014 | Villarreal et al. | |
| 2015/0001344 A1 | 1/2015 | Deel | |
| 2015/0284112 A1* | 10/2015 | Kronhaus | B64G 1/26 |
| | | | 244/169 |
| 2016/0061148 A1 | 3/2016 | Nelson et al. | |
| 2017/0284339 A1 | 10/2017 | Koehler et al. | |
| 2018/0354658 A1* | 12/2018 | Rossettini | B64G 1/1085 |
| 2019/0389602 A1* | 12/2019 | Schilling | B64G 1/285 |

OTHER PUBLICATIONS

International Search Report and Written Opinion for corresponding International Application No. PCT/US2016/056382 dated Jan. 11, 2017.
Wikipedia, "CubeSat", Encyclopedia, https://en.wikipedia.org/w/index.php?title=CubeSat&printable=yes, retrieved Apr. 5, 2016, pp. 1-18.
Kronhaus et al. "Pico-Satellite Orbit Control by Vacuum Arc Thrusters as enabling Technology for Formations of small Satellites." Proceedings of the 5th International Conference on Spacecraft Formation Flying Missions and Technologies, Munich, Germany. 2013.
Kronhaus et al."Design of the UWE-4 picosatellite orbit control system using vacuum-arc-thrusters." 33rd International Electric Propulsion Conference, IEPC-2013. vol. 195. 2013.
Pietzka. Development and Characterization of a Propulsion System for CubeSats based on Vacuum Arc Thrusters. Diss. Universitätsbibliothek der Universität der Bundeswehr München, 2016.
Rathinam. "Design and Development of UWE-4: Integration of Electric Propulsion Units, Structural Analysis and Orbital Heating Analysis." Lulea University of Technology, (2015).

* cited by examiner

SATELLITE WITH INTEGRAL THRUSTERS

The application is a continuation of U.S. application Ser. No. 15/091,008, filed Apr. 5, 2016, which is incorporated by reference in its entirety.

BACKGROUND OF THE INVENTION

Field of the Invention

The invention is in the field of satellite systems that include thrusters.

Description of the Related Art

Small satellites are usable for a variety of functions. One type of very small satellite is the U-class spacecraft or CubeSat satellite, which is a miniaturized satellite used for space research and other purposes. The CubeSat satellite has a volume of about 1 liter, in a cube about 10 cm to a side, with a mass of no more 1.33 kg. Typically CubeSat satellites make use of off-the-shelf electronics and other components, in order to hold down production costs.

CubeSat satellites are often launched along with other satellites of the same size or larger. The size of CubeSat satellites allows them to piggyback on flights with larger satellites, fitting into spaces that would otherwise go unused.

The small size of CubeSat satellites (and other small satellites and micro satellites), and the desire to keep costs low, often leads to simple configurations, that lack desirable functionality and flexibility in use.

SUMMARY OF THE INVENTION

A small satellite, such as a CubeSat satellite, has thrusters integrally formed in its frame.

According to an aspect of the invention, a satellite has thrusters additively manufactured in and part of its frame.

According to another aspect of the invention, a satellite, such as a CubeSat satellite, has an additively manufactured frame with spaces therein for thrusters.

According to yet another aspect of the invention, a satellite, such as a CubeSat satellite, has thrusters with electrically operated propellant.

According to still another aspect of the invention, a satellite, such as a CubeSat satellite, has thrusters that can provide varying amounts of thrust.

According to a further aspect of the invention, a satellite includes: a structural frame; and thrusters within the frame.

By an embodiment according to any one or more paragraphs of this summary, the structural frame is additively manufactured.

By an embodiment according to any one or more paragraphs of this summary, the thrusters are at least in part also additively manufactured, as part of the same additive manufacturing process as the structural frame.

By an embodiment according to any one or more paragraphs of this summary, the thrusters each include propellant.

By an embodiment according to any one or more paragraphs of this summary, the propellant is an electrically-operated propellant.

By an embodiment according to any one or more paragraphs of this summary, each of the thrusters includes electrodes operatively coupled to the electrically-operated propellant, to cause combustion of the electrically-operated propellant.

By an embodiment according to any one or more paragraphs of this summary, the thrusters each include a feed mechanism that feeds the propellant toward the electrodes, as the propellant is consumed.

By an embodiment according to any one or more paragraphs of this summary, the feed mechanism includes a resilient device that biases movement of the propellant toward the electrodes.

By an embodiment according to any one or more paragraphs of this summary, the thrusters each include nozzle inserts that are operatively coupled to the propellant such that pressurized gases produced by combustion of the propellant exit the satellite through the nozzle inserts.

By an embodiment according to any one or more paragraphs of this summary, at least some of the nozzle inserts are configured such that the pressurized gases passing through the nozzle exit the nozzle insert along a longitudinal axis of the thruster.

By an embodiment according to any one or more paragraphs of this summary, at least some of the nozzle inserts are configured such that the pressurized gases passing through the nozzle exit the nozzle insert along at a nonzero angle away from a longitudinal axis of the thruster.

By an embodiment according to any one or more paragraphs of this summary, the thrusters include thrusters in corners of the structural frame.

By an embodiment according to any one or more paragraphs of this summary, the thrusters in the corners of the structural frame include at least four thrusters in the corners of the structural frame.

By an embodiment according to any one or more paragraphs of this summary, for each of at least some of the thrusters the structural frame surrounds and defines a combustion chamber.

By an embodiment according to any one or more paragraphs of this summary, the frame is a cubic frame.

By an embodiment according to any one or more paragraphs of this summary, the satellite is less than or equal to 15 cm in length, width, and height. Other sizes of satellites are possible including satellites that are three times, six times, or nine times the size of this satellite.

By an embodiment according to any one or more paragraphs of this summary, the satellite has a mass of less than or equal to 2 kg.

According to a still further aspect of the invention, a method of making a satellite includes the steps of: additively manufacturing a frame of the satellite; and additively manufacturing thrusters integrated with the frame.

By an embodiment according to any one or more paragraphs of this summary, the additively manufacturing of the frame and the additively manufacturing of at least part of the thrusters are parts of a single additive manufacturing process, building up the thrusters integrated with the frame while the frame is being additively manufactured.

By an embodiment according to any one or more paragraphs of this summary, the additive manufacturing of the frame includes producing chambers within the frame for the thrusters.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A satellite has thrusters that are integral parts of its frame. The frame defines cavities therein where thrusters are located. The thrusters may include an electrically-operated propellant and electrodes to activate combustion in the electrically-operated propellant. The frame may be additively manufactured, and the propellant and/or the electrodes may also be additively manufactured, with the frame and the propellant and/or the electrodes also being manufactured in a single process. In addition the thrusters may have nozzle portions, which either may be additively manufactured (such as in a process with other components) or may be inserts that are placed within the frame during the manufacturing process. The thrusters may be located at corners and/or along edges of the frame, and may be used to accomplish any of a variety of maneuvers for the satellite. To that end, the propellant may be in segments that can be individually consumed, with some segments being relatively large (such as for de-orbit burns) and some segments being relatively small (such as for drag make-up burns). The thrusters may have a propellant feeder for controlled feeding of the propellant toward the electrodes. Alternatively, the thrusters may have another configuration that controls burning, such as an arrangement of electrodes and/or the propellant. The satellite may be a small satellite, such as a CubeSat satellite, for instance having a volume of about 1 liter, and a mass of no more than about 1.33 kg.

Figure 1:
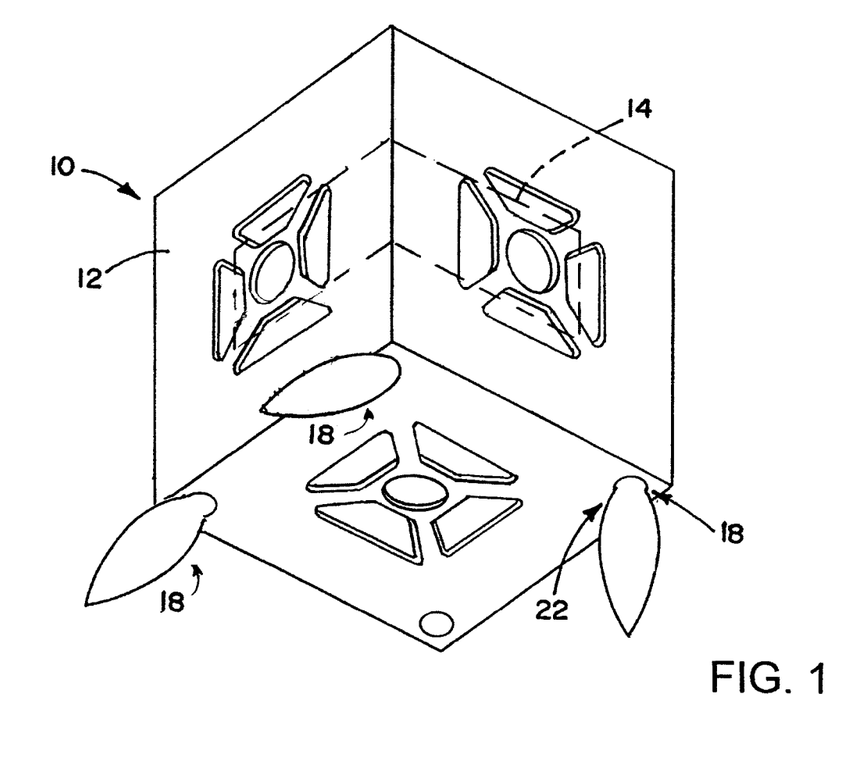
FIG. 1 is an oblique view of a satellite according to an embodiment of the present invention.

FIG. 1 discloses a satellite 10 that can be launched as a payload from a spacecraft. The satellite 10 in the illustrated embodiment is a CubeSat miniaturized satellite, but alternatively the satellite 10 could have any of a variety of different sizes, shapes, and configurations.

The satellite has a cubic frame 12 that encloses a payload 14. The frame 12 may be cubic in shape, having a length, width, and height of about 10 cm, for an overall volume of 1 liter for the satellite 10, as is standard for CubeSat miniaturized satellites. The payload 14 may fit fully within the frame 12, and may have a mass of no more than 1.33 kg. More broadly, the satellite 10 may have a length, width, and height no greater than 15 cm (or no greater than 50 cm), and/or a mass (including the payload 14) of no greater than about 2 kg (or no greater than 20 kg).

Other sizes of satellites are possible including satellites that are three times, six times, or nine times the size of this smallest of CubeSat satellites. These larger-sized satellites may also be referred to as CubeSat satellites. Various sizes of CubeSat satellites are referred to as 1U, 3U, 6U, 9U, and 12U satellites, with the notation indicating the size of the satellite in terms of 10 cm-cube units. Example other sizes of satellites include 10×10×30 cm, with or without an added cylindrical or other-shaped volume on an end; 10×20×30 cm; 12×24×36 cm; 20×20×30 cm; and 20×20×30 cm.

The sizes and weights of the previous paragraph may also be applied to a component of a satellite, such as a propulsion unit that may be affixed to larger small satellite, such as a 25 kg satellite (for example). Such a component should itself be considered as fitting under the definition of "satellite," as the term is used herein.

The payload 14 may be any of a variety of things, able to perform any of a variety of functions. Non-limiting examples include global positioning system (GPS) location devices, communication devices, weather sensors, and cameras or other imaging devices.

The frame 12 may be additively manufactured (3D printed), using any of a variety of know additive manufacturing processes. For example the frame 12 may be made by selectively extruding material in desired locations, selectively building up the frame 12 layer by layer. An alternative manufacturing processes for producing the frame 12 include fused-filament fabrication (FFF), also referred to as fused-deposition modeling (FDM). The frame 12 may be made out of any of a variety of materials suitable for additive manufacturing (and suitable for other characteristics desired from the frame 12). Examples of such materials include acrylonitrile butadiene styrene (ABS), polycarbonate, polyetherimide (PEI), and polyurethane, among others.

As an alternative, at least parts of the frame 12 may be produced other than by additive manufacturing. For example portions of the frame 12 may be produced by conventional manufacturing processes such as casting or rolling, perhaps in conjunction with subtractive processes such as boring or other machining processes to remove material.

A series of thrusters 18 are located within the frame 12. The thrusters 18 may be located along edges of the frame 12, where pairs of sides of the frame 12 come together. The thrusters 18 may be located in cavities 22 within the frame 12 that are formed during the manufacture of the frame 12, such as by omitting material of the frame 12 where the thrusters 18 will be located. The cavities 22 may be elongate cavities have a suitable cross-sectional shape for receiving propellant and/or other components of the thrusters 18, as explained in greater detail below.

The outlets for the thrusters 18 thus may be at corners of the frame 12, where three of the sides of the frame 12 come together. The thrusters 18 may be configured to provide thrust in the same direction, but at different locations. Alternatively one or more of the thrusters 18 may be configured to provide thrust in different directions than other of the thrusters 18.

All or part of the thrusters 18 may be integrally formed as part of the formation of the frame 12, with some or all of the components of the thrusters 18 additively manufactured, perhaps being manufactured at the same time and/or as part of the same additive manufacturing process as the manufacturing of the frame 12.

There may be any number of suitable thrusters 18. In one embodiment there may be four thrusters 18, all oriented in the same direction, with longitudinal axes parallel to one another. All four of the thrusters 18 may provide thrust in the same direction. For example to change the velocity of the satellite 10 in order to change its orbit (or deorbit the satellite10). Alternatively there may be a different number of thrusters, for example more than four thrusters, with some of the thrusters oriented perpendicular relative to other of the thrusters. Some thrusters may be used to change the velocity of the satellite, and other thrusters may be used to spin the satellite, for example.

Figure 2:
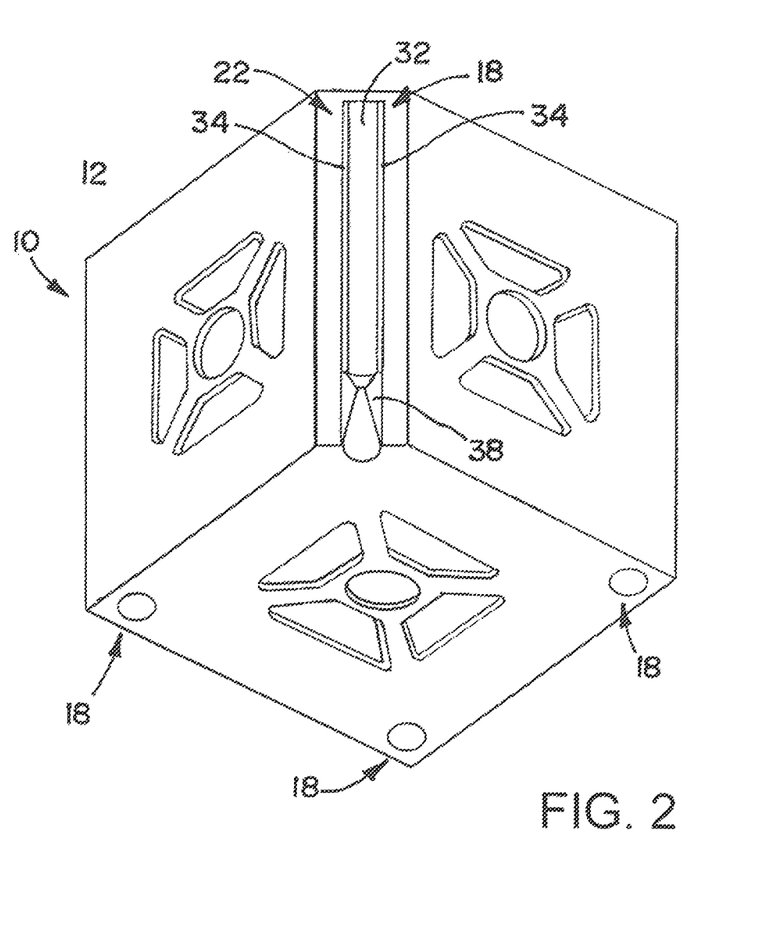
FIG. 2 is an oblique, partial cutaway view of the satellite of FIG. 1, showing details of a thruster of the satellite.
Figure 3:
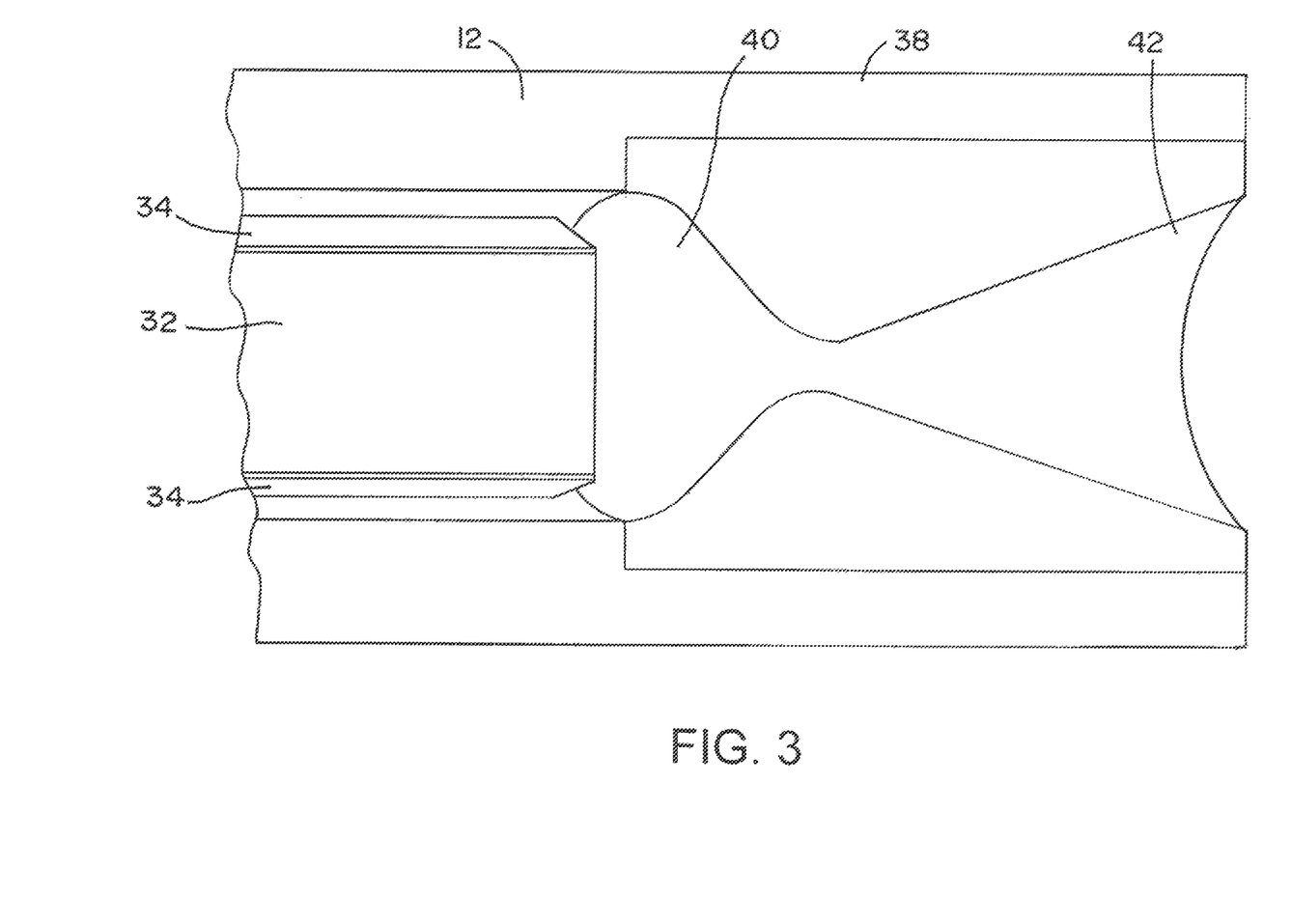
FIG. 3 is a side sectional view of part of the thruster of the satellite of FIGS. 1 and 2.

Referring now in addition to FIGS. 2 and 3, the thrusters 18 may each include an electrically-operated propellant 32, a pair of electrodes 34, and a nozzle structure 38. The propellant 32 is initiated by a current being applied across it by the electrodes 34. The pressurized gases created by combustion of the propellant 32 then pass through a nozzle structure 38 before exiting the satellite 10, producing thrust. The nozzle structure 38 may include a converging portion 40 and a diverging portion 42, which may help convert some of the heat energy of the pressurized gasses into kinetic energy, enhancing the amount of thrust produced. The nozzle structure 38 alternatively may have any of a wide variety other configurations than the one illustrated in FIGS. 2 and 3. As a further alternative, optionally the nozzle structure 38 may be omitted entirely.

Some or all of the components of the thrusters 18 may be additively manufactured, perhaps as part of the same additive manufacturing process used to produce the frame 12. The propellant 32, the electrodes 34, and/or the nozzle structure 38 (each individual component or any combination of them) may be additively manufactured, such as by use of different extruder nozzles and/or different raw materials for manufacturing. For example the propellants 32 and the electrodes 34 may be additively manufactured together in a single process, along with the additive manufacturing of the frame 12. The nozzle structure 38 may also be additively manufactured as part of this process. Alternatively the propellant 32, the electrodes 34, and/or the nozzle structure 38 may be independently manufactured, using additive methods or other manufacturing methods, and may be inserted into the satellite 10 as a unit, during the build up (additive manufacture) of the frame 12. For example, alternatively the propellant 32 may be cast, and then inserted into the frame 32, either during the additive manufacturing process or after the additive manufacturing process.

The propellant 32 may be made of materials that produce an electrically-activated (or electrically operated) solid propellant. Examples of such materials may be found in US Patent Publication 2014/0174313 A1, which is incorporated herein by reference in its entirety. As described in that publication, a source material for making an electrically-operated solid propellant may include an oxidizer, a fuel, and a binder. The oxidizer may be a liquid-based perchlorate oxidizer that includes aluminum perchlorate, barium perchlorate, calcium perchlorate, lithium perchlorate, magnesium perchlorate, perchlorate acid, strontium perchlorate, and/or sodium perchlorate, to give a few examples. The fuel may be a metal-based fuel, for example including tungsten, magnesium, copper oxide, copper, titanium, and/or aluminum. The binder may include casein, methyl cellulose, polyethylene oxide, polyvinyl acetate, and/or polyvinyl alcohol. In one example, a material used in an additive manufacturing process may have 150-250% of the solvent (by weight percentage) as that used for a bulk cast or molded material that is produced in a non-additive process.

The electrically operated propellant ignites with the application of electricity and correspondingly extinguishes with the cessation of electricity, even when exposed to high pressures, though below a high pressure threshold. For example, when exposed to ambient or high pressures, such as atmospheric pressure, pressures greater than 200 psi, 500 psi, 1000 psi, 1500 psi and up to 2000 psi, the electrically operated propellant is extinguished with the interruption of electricity (e.g., voltage or current) applied across the electrically operated propellant. In other words, without application of electricity, the combustion of the electrically operated propellant is not self-sustaining at high pressures, such as high pressures of 200 psi or more and less than 2000 psi. Thus, the electrically operated propellant is configured for "on" and "off" operation under the described variety of conditions.

A battery or other power source (not shown) may be electrically coupled to the electrodes 34 to apply a suitable voltage or current across the propellant 32, to ignite and/or maintain combustion in the propellant 32. A controller (not shown), such as an integrated circuit device (or other electrical or electronic controller) with suitable hardware and/or software may used to control the supply of electrical power to the electrodes 34. The controller may be operatively coupled to a communication device, such a radio, to receive instructions from a ground station or space platform, and/or to send data or information.

The oxidizer may be an aqueous solution, with the oxidizer material dissolved in water and/or glycerol. It has been found that controlling the amount of water and/or glycerol in the extruded material is important in additive manufacture of the propellant 32. Too much solvent in the printed mixture can cause problems with curing the extruded material and having the extruded material properly maintain its shape. Too little solvent can result in problems with the material adhering to other material layers.

The raw propellant material that is used to additively manufacture the propellant 32 may have any of a variety of other suitable formulations. Broadly, the raw propellant material may include a fuel, a solvent (e.g., water or glycerin), an oxidizer, and a binder. The fuel and the oxidizer are the chemically-active components that react with one another to produce the pressurized gases. The solvent receives the fuel and other components, to allow mixing together of the components into a flowable material. The binder aids in maintaining the raw material as a unified material that can be cured and/or dried into a solid mass.

The formation of the thrusters 18 integrally with the frame 12 may involve an extrusion process with multiple extrusion heads for extruding separate raw materials to form the frame 12, the propellant 32, and the electrodes 34. A suitable controller may be used to control stepper motors (or other suitable devices) to dispense raw materials (from reservoirs) for the frame 12, the propellant 32, and the electrodes 34, in suitable locations, to build up the satellite 10. Alternatively the electrodes 34 may be formed separately, and inserted in suitable locations during the manufacturing process, with the frame 12 and the propellant 32 formed around the electrodes 34.

The electrodes 34 may be formed by various methods. The electrodes 34 may be formed by an FFF process, using a conductively loaded polymer loaded with graphene, graphite, or metal particles. Another additive manufacturing method is a method of printing solid metal wire integrated with plastic in a FFF machine. As another possibility, the electrodes 34 can formed using a liquid-dispensing system that deposits a fine aerosol or liquid drop with a conductive ink with typically silver or gold loading.

For each of the thrusters 18 the propellant 32 and the electrodes 34 may be configured to produce a desired thrust output. This desired thrust output may involve producing different amounts of thrust at different times, such as providing smaller (relatively small) earlier amounts of thrust, such as for maneuvering or drag make-up burns, and larger (relatively large) later amounts of thrust, such as for de-orbit burns. The thrust output may be used for orbit maintenance and/or orbital adjustments.

The nozzle structure 38 may be configured to expel pressurized gases in any of a variety of suitable directions. The nozzle structure 38 may be configured to expel pressurized gases along the longitudinal axis of the thruster 18, or may be configured to expel the pressurized gases at a nonzero angle, in any suitable direction, relative to the axis of the thruster 18. Thus a single thruster may be configured to tilt the satellite 10 (moving the satellite in pitch and/or yaw), and/or may be configured to roll the satellite 10 about its longitudinal axis. Firing multiple of the thrusters 18 at the same time may allow for pure acceleration of the satellite 10 so as to cause translation of the satellite 10 without changing the orientation of the satellite 10. In addition, any of a variety of complicated maneuvers may be accomplished or accomplishable, including changes of orientation coupled with accelerations to change the translation velocity of the satellite 10. A control mechanism or controller (not shown) may be operably coupled to the thrusters 18 to fire one or more of the thrusters 18 at a chosen time or times, to steer the satellite and/or change orientation of the satellite 10 as desired. The control mechanism (or controller) may include hardware and/or software programmed and/or configured to carry out desired instructions (which may be predetermined, and/or which may be changed based on conditions during operation).

Figure 4:
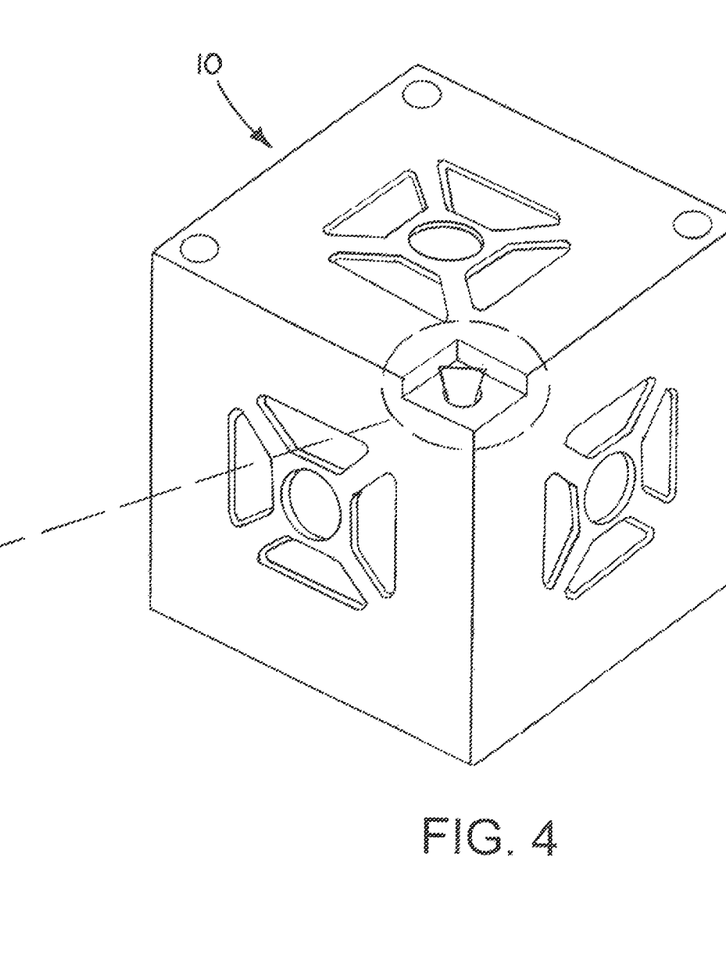
FIG. 4 is an oblique, partial cutaway view of a satellite, with a thruster in accordance with another embodiment of the invention.
Figure 5:
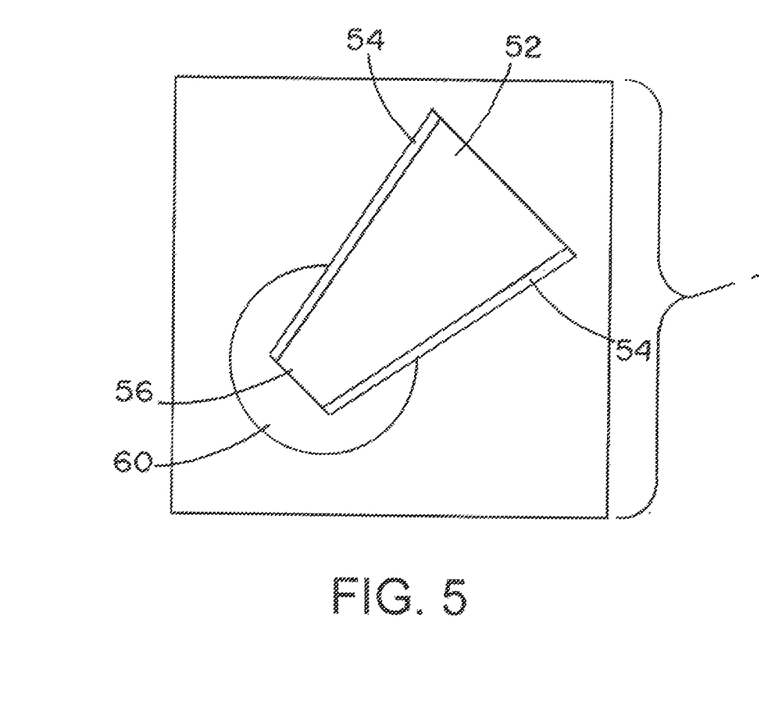
FIG. 5 is an end view of the thruster of FIG. 4.

FIGS. 4 and 5 shows one possible configuration, in which a propellant 52 has a trapezoidal cross-section shape, with electrodes 54 on opposed sides of the trapezoidal propellant 52. The burn front begins at an edge face 56 of the propellant 52, the narrow face of the propellant 52 where the electrodes 54 are closest together. The face 56 protrudes into a combustion chamber 60 that is operatively coupled to route combustion products through a nozzle structure such as the nozzle structure 38 (FIG. 3) and out of the satellite 10 to produce thrust. As the burn front moves further from the face 56 the burn front widens out. The result is a higher burning rate, producing pressurized gasses at a greater rate so as to produce an increased amount of thrust. It will be appreciated that alternatively the propellant may be configured in any of a variety of ways, in conjunction with the configuration of electrodes, to produce a desired burn rate (or thrust rate) that varies over time.

Figure 6:
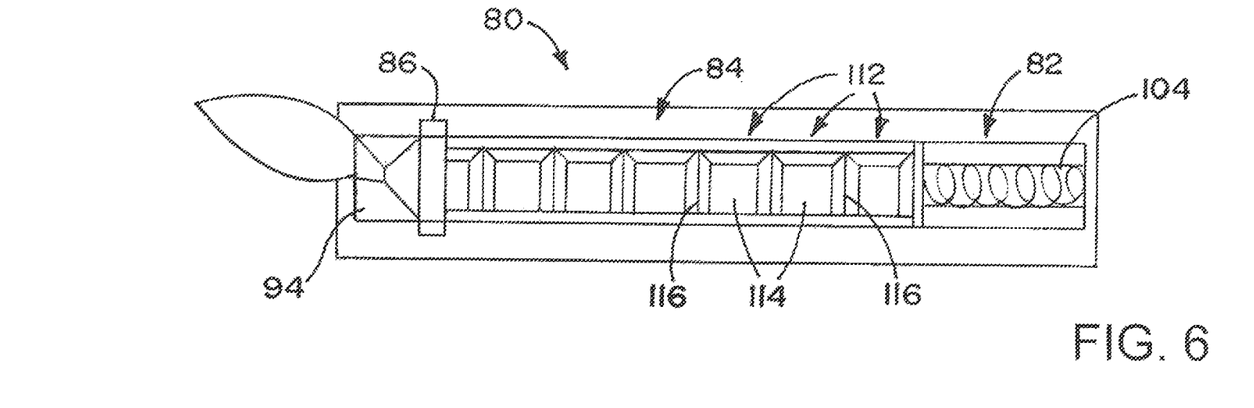
FIG. 6 is a side view of a thruster in accordance with yet another embodiment.

FIG. 6 shows another configuration, a thruster 80 in which a propellant feeder or feed mechanism 82 is used to push portions of a propellant 84 into engagement with electrodes 86 that are at one end of the thruster 80. The electrodes 86 are configured to activate a portion of the propellant 84 at any one time, with only a portion of the propellant 84 between the electrodes 86. The electrodes 86 may be located at one end of a propellant-receiving cavity 90 in which the propellant 84 is located. The electrodes 86 are located adjacent to or near a nozzle structure 94. The electrodes 86 cause combustion in a portion of the propellant 84, and the pressurized gases exit a satellite such as the satellite 10 (FIG. 1), through the nozzle structure 94. As the propellant 84 is consumed the feeder 82 is used to bring additional amounts of the propellant 84 between the electrodes 86 as desired, to enable consumption of additional amounts of the propellant 84 to produce additional thrust.

The propellant feeder 82 may be any of a variety of mechanical mechanisms for moving the propellant 84 (or parts of the propellant 84) into engagement with the electrodes 86. To give one example, the feeder 82 may include a push rod 100 that pushes the propellant 84 toward the electrodes 86. The push rod 100 may be actively driven, such as by a small actuator, for example a small electrical motor. Alternatively, as shown in the illustrated embodiment, a resilient force, such as that provided by a coil spring 104, may bias movement of the propellant 84 toward the electrodes 86. Many other configurations for the feeder 82 are possible, including use of other sorts of springs, other resilient devices, and/or other sorts of mechanical pusher mechanisms.

The propellant 84 may be made up of multiple propellant segments or packets 112. Each of the segments 112 includes propellant material 114, surrounded by sealing material 116. The sealing material 116 prevents moisture or other contaminants from getting into the propellant segments 112 prior to use. Exposure of the propellant material 114 to moisture, such as occurs upon exposure to space, results in the propellant 114 eventually absorbing enough moisture so as become unusable. Therefore the sealing material 116 in essence keeps the propellant material 114 in good condition (uncontaminated by moisture) prior to use.

The sealing material 116 may combustible, in that it burns off as the propellant material 114 within is consumed. The sealing material 116 also may serve to some extent as a barrier, preventing combustion from one propellant segment 116 to another of the propellant segments 116 until desired. The sealing material 116 could be made out of any of a variety of suitable materials, for example poly(vinyl alcohol) (PVA), silicone, epoxy, or any other suitable organic or inorganic material.

Figure 7:
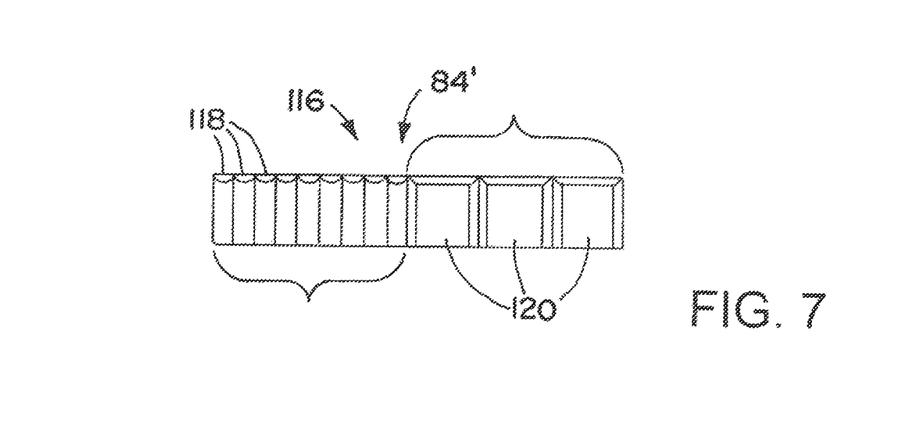
FIG. 7 shows an alternative arrangement of propellant segments usable with the thruster of FIG. 6, in accordance with still another embodiment of the invention.

As shown in FIG. 6, all of the propellant segments 112 may be the same size, or roughly the same size, providing equal (or substantially equal) amounts of thrust. Alternatively, as shown in FIG. 7, a propellant 84' may have segments 116' with different sizes, including relatively small segments 118 with a relatively small amount of propellant, and relatively large segments 120 with a relatively large amount of propellant. The differently-sized propellant segments may be used for providing different amounts or sorts of thrust to achieve different purposes. For example the relatively small segments 118 may be used for drag make-up burns, while the satellite 10 (FIG. 1) is in orbit. The relatively large segments 120 may be used to provide larger amounts of thrust, such as for de-orbiting.

While the propellant 84' has only two sizes of segments, it is possible for there to be three or more sizes of segments. The sizes for the individual propellant segments may be selected based on their need. With additive manufacturing processes it is possible for the segments (their sizes and/or other characteristics) to be tailored to an individual need for the satellite 10, based on an intended use of the satellite. A likely mission might use a large propulsion unit to change orbit in altitude or inclination then use small thrusts to control attitude or de-spin a reaction wheel. Then the mission may finally use a larger thrust to de-orbit the vehicle when it is no longer needed. The additive manufacturing process allows flexibility in configuring the propellant charge (the number and characteristics of segments), while keeping costs low.

The propellant charges 84 and 84' may include any suitable number of segments, from two segments to ten or more segments. The segments may be of two types or three or more types.

Figure 8:
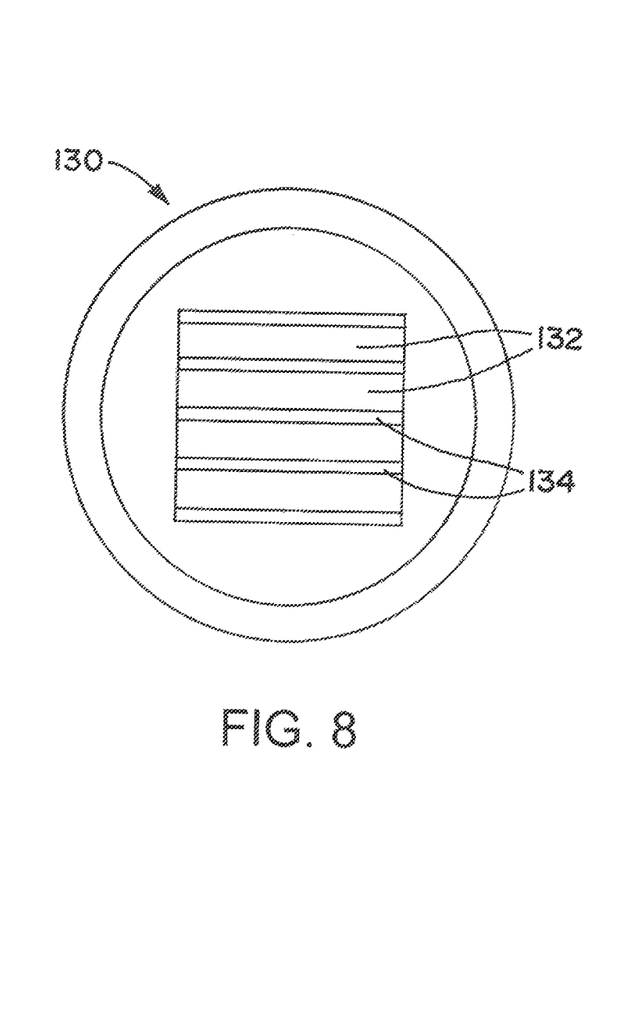
FIG. 8 is an oblique view showing parts of a thruster in accordance with a further embodiment.

FIG. 8 shows another possible thruster configuration, a thruster 130 having a propellant 132 with a series of parallel plates 134 interspersed between sections of the propellant 132. A voltage may be applied across two or more adjacent plates of the plates 134, in order to trigger combustion in the propellant 132.

Satellites such as the satellite 10 (FIG. 1) provide many benefits relative to previous small satellites. The satellite 10 may be relatively inexpensive to manufacture, and may be easy to manufacture using additive manufacturing methods. In addition, the use of an electrically operated propellant may allow the satellite 10 to be less of safety issue than a propellant that is not electrically operated. Further additive manufacturing may enable the production of the frame 12 with spaces therein for receiving the thrusters 18, whether or not the thrusters 18 are additively manufactured along with the frame 12. There is an advantage to providing thrust to small satellites, such as CubeSat satellites, while still keeping the satellites inexpensive to produce, and safe to handle (making the satellites suitable for inclusion in cargo areas where more hazardous materials could not be used).

Figure 9:
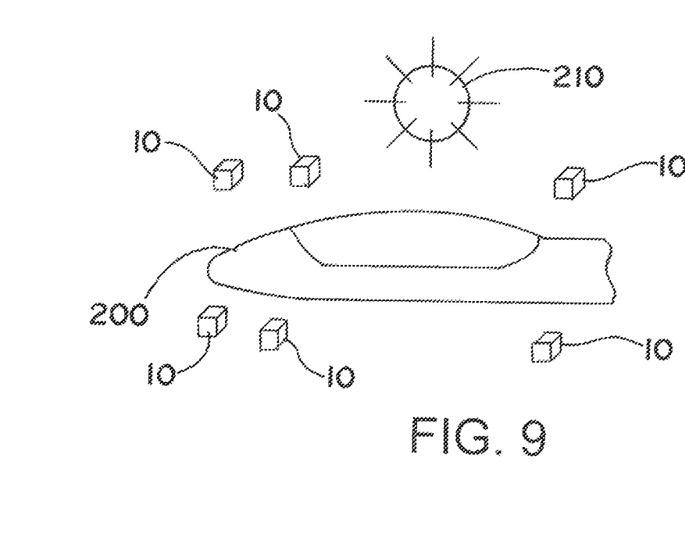
FIG. 9 is a schematic view showing deployment of satellites according to a still further embodiment of the invention.

FIG. 9 shows many of the satellites 10 being launched from a mothership 200 that is also used to launch a satellite 210 that is larger than the satellites 10. The satellites 10 may be independently controlled after launch, and may have their thrusters independently actuated.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A satellite comprising:
a structural frame; and
thrusters within the frame;
wherein the thrusters include thrusters in corners of the structural frame, located in cavities within the frame that are integrally formed during manufacture of the frame; and
wherein the thrusters surround a payload space for receiving a payload, where the payload space is defined and enclosed by the frame.

2. The satellite of claim 1, wherein the structural frame is additively manufactured.

3. The satellite of claim 2, wherein the thrusters are at least in part also additively manufactured, as part of the same additive manufacturing process as the structural frame.

4. The satellite of claim 1, wherein the thrusters each include propellant.

5. The satellite of claim 4, wherein the propellant is an electrically-operated propellant.

6. The satellite of claim 5, wherein each of the thrusters includes electrodes operatively coupled to the electrically-operated propellant, to cause combustion of the electrically-operated propellant.

7. The satellite of claim 6, wherein the thrusters each include a feed mechanism that feeds the propellant toward the electrodes, as the propellant is consumed.

8. The satellite of claim 7, wherein the feed mechanism includes a resilient device that biases movement of the propellant toward the electrodes.

9. The satellite of claim 4, wherein the thrusters each include nozzle inserts that are operatively coupled to the propellant such that pressurized gases produced by combustion of the propellant exit the satellite through the nozzle inserts.

10. The satellite of claim 9, wherein at least some of the nozzle inserts are configured such that the pressurized gases passing through the nozzle exit the nozzle insert along a longitudinal axis of the thruster.

11. The satellite of claim 9, wherein at least some of the nozzle inserts are configured such that the pressurized gases passing through the nozzle exit the nozzle insert along at a nonzero angle away from a longitudinal axis of the thruster.

12. The satellite of claim 1, wherein the thrusters in the corners of the structural frame include at least four thrusters in the corners of the structural frame.

13. The satellite of claim 1, wherein for each of at least some of the thrusters the structural frame surrounds and defines a combustion chamber.

14. The satellite of claim 1, wherein the frame is a parallelepiped frame.

15. The satellite of claim 14, wherein the parallelepiped frame is a cubic frame.

16. A satellite comprising:
a structural frame; and
thrusters within the frame;
wherein the thrusters each include propellant;
wherein the propellant for at least some of the thrusters is a trapezoidal propellant with a trapezoidal cross-section shape.

17. The satellite of claim 16, wherein each of the at least some of the thrusters include electrodes on opposed sides of the trapezoidal propellant.

18. The satellite of claim 17, wherein the electrodes on both sides contact the trapezoidal propellant.

19. The satellite of claim 16, wherein the thrusters include thrusters in corners of the structural frame, located in cavities within the frame that are integrally formed during manufacture of the frame.

20. The satellite of claim 16, wherein the thrusters surround a payload space for receiving a payload, where the payload space is defined and enclosed by the frame.

21. The satellite of claim 16, wherein the frame is a parallelepiped frame.

* * * * *